United States Patent [19]

Seely

[11] Patent Number: 5,489,756
[45] Date of Patent: Feb. 6, 1996

[54] SLOT FABRICATION BY ELECTRICAL DISCHARGE MACHINING

[75] Inventor: Richard L. Seely, Horseheads, N.Y.

[73] Assignee: Corning Incorporated, Corning, N.Y.

[21] Appl. No.: 330,580

[22] Filed: Oct. 28, 1994

[51] Int. Cl.⁶ .................. B23H 7/06; B23H 9/00
[52] U.S. Cl. .................................................. 219/69.12
[58] Field of Search ............ 219/69.12, 69.17, 219/69.2, 69.16; 425/461, 462, 464

[56] References Cited

U.S. PATENT DOCUMENTS

| | | | |
|---|---|---|---|
| 2,526,423 | 10/1950 | Rudorff | 219/69.12 |
| 4,205,213 | 5/1980 | Inoue | 219/69.12 |
| 4,233,486 | 11/1980 | Inoue | 219/63.12 |
| 4,403,131 | 9/1983 | Cunningham et al. | 219/69.12 |
| 4,527,035 | 7/1985 | Majestic | 219/69.12 |
| 4,691,089 | 9/1987 | Balleys | 219/69.12 |
| 4,736,656 | 4/1988 | Futamura | 219/69.17 |
| 4,983,803 | 1/1991 | Pringle et al. | 219/69.12 |
| 5,004,883 | 4/1991 | Brown et al. | 219/69.12 |
| 5,270,513 | 12/1993 | Sergent | 219/69.12 |

FOREIGN PATENT DOCUMENTS

| | | | |
|---|---|---|---|
| 0248126 | 12/1987 | European Pat. Off. | |
| 60-114428 | 6/1985 | Japan | 219/69.12 |
| 61-288928 | 12/1986 | Japan | 219/69.12 |
| 62-9716 | 1/1987 | Japan | 219/69.12 |

Primary Examiner—Geoffrey S. Evans
Attorney, Agent, or Firm—Kees van der Sterre

[57] ABSTRACT

A method is set forth for slotting a workpiece by utilizing an EDM-wire cutting method wherein detrimental effects of an intrinsic slot taper produced by EDM wire cutting are compensated for and averaged out by alternating the direction of the wire entrance and exit along adjacent slots formed in the workpiece.

23 Claims, 2 Drawing Sheets

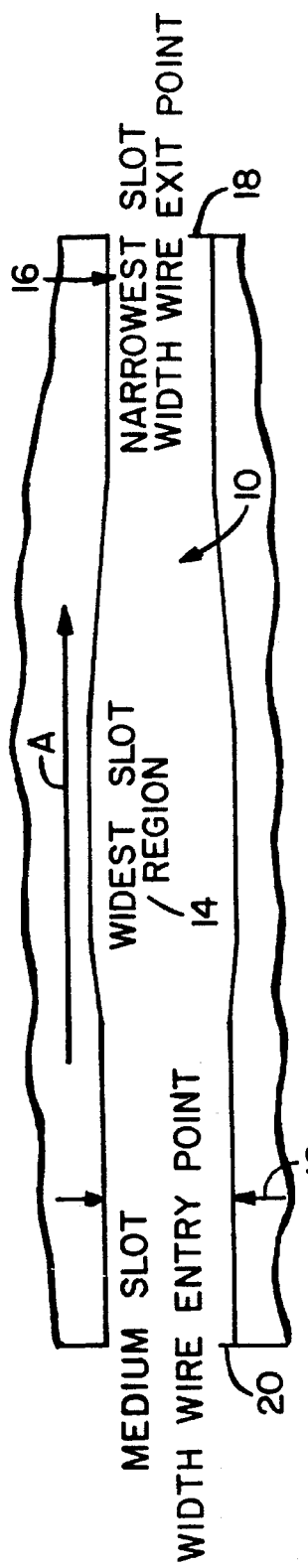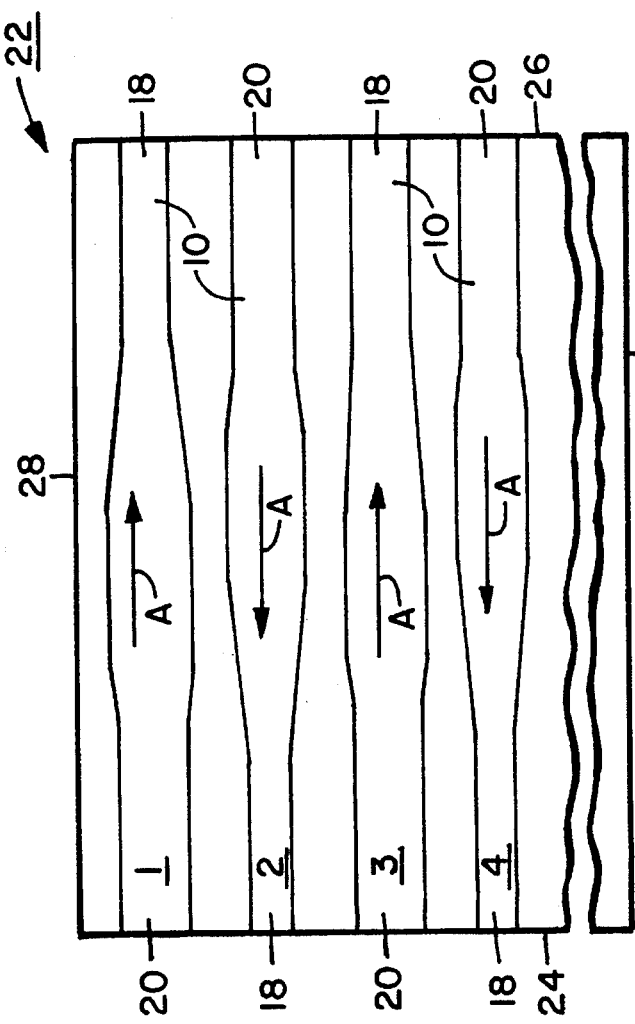

SLOT FABRICATION BY ELECTRICAL DISCHARGE MACHINING

BACKGROUND OF THE INVENTION

Conventional wire electrical discharge machining (EDM) equipment includes a head assembly mounted on a machine tool body and a numerically controlled positioning table. The wire equipment contains a spool assembly on which a fine wire is held taut between two spools. The drive spool moves the wire at a fixed rate from one spool to another with the useable work length between the two spools being about 4" to 8", depending on the work height to be cut. The cutting rate depends upon the wire size and the amperage carried by the wire, plus the feed rate set for the depth of the cut. Deionized water is not only normally used as the dielectric, but also functions to flush out eroded particles produced during the cutting action, however, hydrocarbon oils can also be used. As is typical with all EDM operations, the wire electrode may produce a uniform overcut or overburn of about 0.002" to 0.003" over the diameter of the wire electrode.

In the extrusion forming of ceramic honeycomb structures used in catalytic converters for internal combustion engines, it is necessary to form extrusion dies with substantially long, thin slots which are not only straight and extend across the face of the die, but which also have parallel sidewalls, are burr free and have consistent surface finish. In addition, such long thin slots have a length greater than about 3½", a depth in excess of about 0.1" and a width not greater than about 0.012".

Known EDM wire processes, such as disclosed in U.S. Pat. Nos. 2,526,423; 4,205,213; 4,233,486; 4,403,131; and 4,527,035 are all capable of producing slots, however, such processes are plagued with the problem of forming non-uniform slot widths along the length of the formed slots, which problem is virtually inherent in the process. That is, measurements have indicated that an EDM wire-cut slot varies in width from the point of wire entry to the point of wire exit, with the width of the entry point always being wider than the width of the exit point. As the strand of wire travels through the slot, it is constantly being eroded, thus becoming smaller in cross-sectional area as it nears the exit point of the workpiece. Additionally, the wire tends to vibrate, similar to a guitar string, with the highest amplitude being near the longitudinal center of the slot being cut within a workpiece, forming a wide center region.

Thus, a tapered pattern is formed along the longitudinal extent of each slot, with a medium slot width being formed adjacent the wire entry point of the workpiece, a widest slot region being formed centrally of the longitudinal extent of the slot being formed, and a narrow slot width being formed adjacent the wire exit point of the workpiece. This tapered width pattern repeats itself each time a slot is formed across a workpiece from side to side, and from end to end when cross slots are formed. In the case of rows of slots formed in the discharge face of an extrusion die for forming cellular structures, the effect of this variation in slot width across each of the slots creates a graded condition across the die which correlates very closely with a problem of bow in the extrudate. The formation of bow, which is the tendency for the extrudate to curve upon leaving the extruder, is an undesirable condition and produces detrimental effects in the formation of cellular or honeycomb structures.

The formation of bow is not a self-correcting disturbance during the extrusion process. That is, the faster flowing areas of the die will continue to flow faster unless some sort of corrective hardware is utilized. A bow deflector is the most commonly used state of the art item for correcting bow, but like most other corrective hardware devices, it is viable only for very modest degrees of bow. At best, such corrective artifices represent crutches, which simply apply an opposite unbalancing effect to offset the original unbalanced condition and in some cases other flow problems, all in the hope of combining two asymmetrical conditions into an acceptable one.

The present invention overcomes the problems of the slot width variation encountered with known EDM wire processes by correcting or greatly ameliorating the bow problem within an EDM slotted die, and thus virtually eliminating the need for extraneous remedial hardware previously necessary to correct such problem.

SUMMARY OF THE INVENTION

In its simplest form, the present invention relates to a method of neutralizing the gradient-causing effect of the traditional slot cutting sequence, by EDM wire cutting a plurality of slots within a surface of a workpiece and programming the cutting sequence such that the entry point of the EDM wire forming each slot across the workpiece is alternated from side-to-side on every other slot. By alternating the entry point of the EDM wire, the entry width and exit width of each slot are alternately adjacent each other, thus preventing any cumulative gradient effects to take place across the face of the workpiece. As a result, when the workpiece is in the form of an extrusion die, the formation of bow during extrusion is greatly reduced or virtually eliminated.

BRIEF DESCRIPTION OF THE DRAWINGS

FIG. 1 is a greatly enlarged schematic view illustrating a slot width pattern from its entry point to its exit point.

FIG. 3 is a greatly enlarged schematic fragmental view of a portion of a die illustrating the positionment of adjacent slots formed in accordance with the present invention.

DESCRIPTION OF THE PREFERRED EMBODIMENTS

Figure 2:
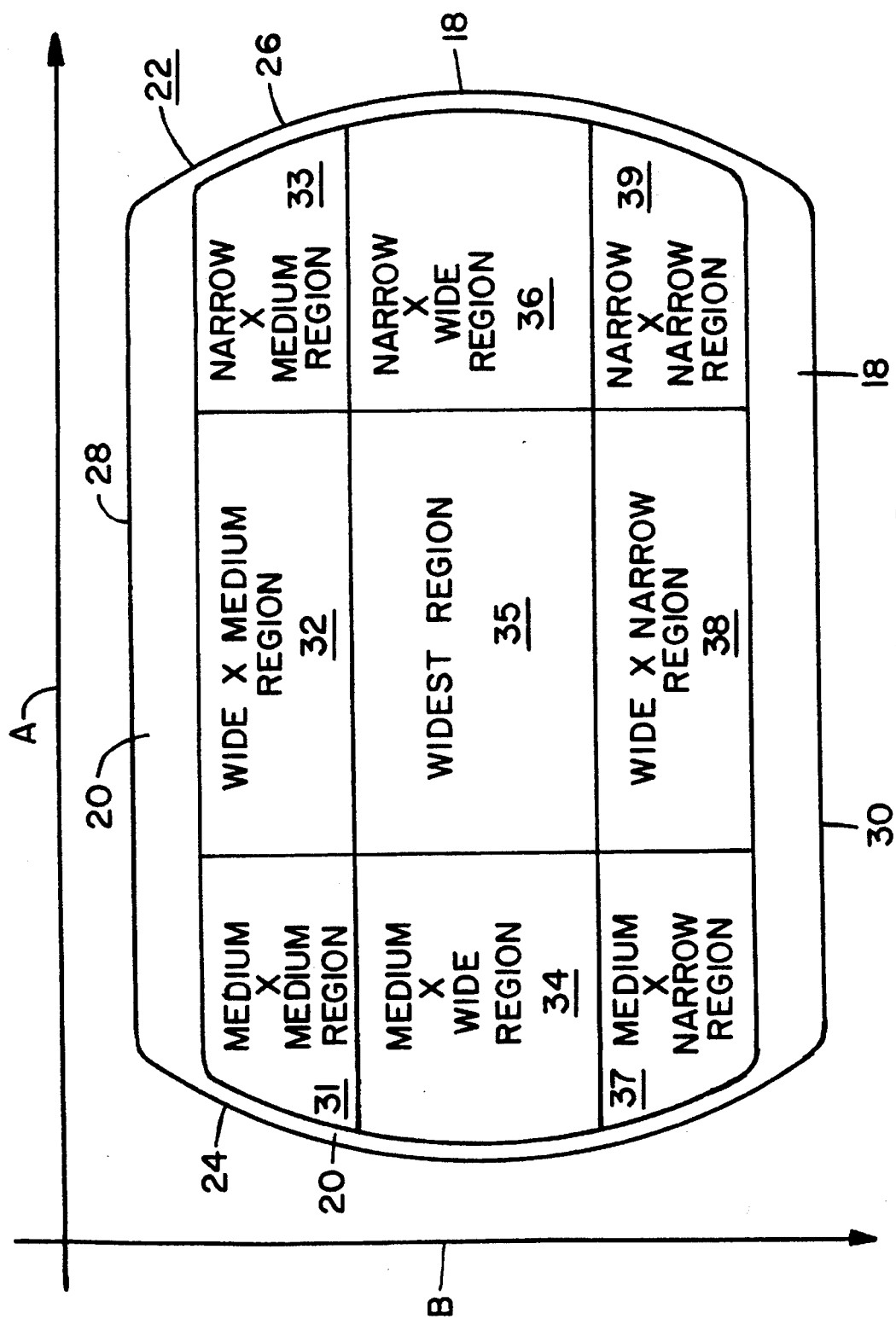
FIG. 2 is a schematic plan view of a die illustrating the graded conditions which are formed across a die face by conventional EDM wire slotting, and which are virtually eliminated by the present process.

The small difference in a slot width formed by EDM wire cutting, from its entry point upon a workpiece to its exit point thereof which may be as minute as 0.0001", is an inherent attribute of the EDM wire process. That is, as the strand of wire travels from the take-off spool to the take-up spool through the slot, it is constantly being eroded and thus becomes smaller in cross-sectional area as it nears the exit point of the slot. In addition, in view of the fact that the wire is only held at its opposite ends by the two spools, the wire tends to vibrate with the highest amplitude being near the center of the workpiece, thus causing a widening of the slot in the center region. Accordingly, a long wire has a greater susceptibility to such harmonics. Since this phenomenon sets forth the intrinsic nature of the EDM wire behavior, it had to be accepted as a given when attempting to solve the problem of bow in an extrudate from a die formed by the EDM wire process.

Thus, in view of the fact that it appeared impossible to eliminate the variation in slot width across a die body, a solution to the problem would be to convert the total graded effect of the tapered slots, which extend across the full diameter of the die, into a multitude of small, local disturbances well within the averaging capabilities of the die, so as to cancel each other out.

Image analysis plots of wire-EDM formed slots revealed a variation in slot width such as shown by the greatly enlarged slot 10 of FIG. 1. Although the taper variation is very subtle, the concentration and repetition of such taper produces bow in an extrudate. The arrow A indicates the horizontal cutting direction of the EDM wire, which, in the case of FIG. 1, is from left to right. A medium slot width 12 is formed adjacent the wire entry point 20, whereas the narrowest slot width 16 is formed adjacent the wire exit point 18. As the EDM wire travels through the die blank in the direction of arrow A, erosion causes the wire to become thinner as it progresses across the die blank, thus resulting in a narrower slot width adjacent the exit end 18 of the slot 10. Wire harmonics cause a wider slot width in the middle region 14 of the die, due to wire vibration. The slot width variation is so subtle that conventional machining and measuring techniques would not detect the problem. However, using advanced measuring systems, such as image analysis, lead to the discovery of the slot taper problem. This pattern repeats itself across the die as successive slots are formed along the length of the die, and as additional slots are formed 90° to the initial slots, resulting in regions within the die face with narrower slots and regions of wider slots.

Referring now to FIG. 2, a die 22 is schematically shown illustrating the various regions that are formed across the face of the die as a plurality of slots 10 are formed therein. In forming a die 22 for extruding cellular or honeycomb structures, it is necessary to form a plurality of parallel spaced-apart slots, which extend across the face of the die, but which are spaced apart between the ends of the die. In addition, a plurality of parallel spaced-apart slots are formed 90° to the slots extending across the face of the die and are spaced apart from side to side of the die face.

In FIG. 2, arrow A illustrates the direction of the cutting of rows of slots across the discharge face of a die body, such that the EDM wire enters the face of the die from the left side of FIG. 2 and exits from the right side of FIG. 2. In a like manner, arrow B illustrates the end to end cutting direction of the EDM wire, formed 90° to the horizontal slots, illustrating the fact that the EDM wire enters the die 22 at the top of FIG. 2 and exits the face of the die at the bottom of FIG. 2.

In view of the fact that the horizontal slots formed by the EDM wire traveling in the direction of arrow A have an entrance end 20 on the left side 24 of the die 22, and an exit end 18 on the right side 26 of the die 22, and the end-to-end or vertical slots formed 90° to the horizontal slots in the direction of arrow B have an entrance end 20 at the upper end 28 of the die 22, and an exit end 18 at the bottom end 30 of the die 22, the die face has 9 dissimilar regions.

A first region 31 in the upper left hand corner of the die 22 is considered a medium-medium region in view of the fact that both the slots formed along arrow A and arrow B enter it at such region. A second region 32 in the top middle of the die 22 is considered a wide-medium region in view of the fact that the slots cut along the direction of the arrow A are at their widest point due to the vibration of the wire, whereas the slots formed along the direction of arrow B are at their medium entrance point. A third region 33 in the upper right hand corner of the die 22 is considered a narrow-medium region in view of the fact that the slots formed in the direction of arrow A are at their narrowing exiting width, whereas the slots formed along the arrow B are at their entrance medium width.

A fourth region 34 formed adjacent the left middle of the die 22 is considered to be a medium-wide region in view of the fact that the slots formed along the direction of arrow A are at their entrance medium width, whereas the slots formed along the direction of arrow B are at their widest width due to the vibration of the wire. A fifth region 35 is formed in the center of the die 22, and represents the widest region of both the slots formed in the direction of arrow A and of arrow B due to the vibration of the forming EDM wire. A sixth region 36 is formed at the right center part of the die 22 and is considered to be a narrow-wide region due to the fact that the slots formed along the direction of arrow A are at their narrowest exit point whereas the slots formed along the arrow B are at their widest central part of the forming process.

A seventh region 37 is formed at the lower left corner of the die 22 and is considered to be a medium-narrow region due to the fact that the slots formed along the direction of arrow A are at their medium entrance width, whereas the slots formed along the arrow B are at their narrowest exit width. An eighth region 38 formed adjacent the center bottom of the die 22 is considered to be a wide—narrow region due to the fact that the slots formed along arrow A are at their widest central point whereas the slots formed along the arrow B are at their narrowest exit width. Finally, a ninth region 39 is formed at the lower right hand corner of the die 22 and is considered to be a narrow—narrow region in view of the fact that both the slots formed along the direction of arrow A and along the direction of arrow B are at their narrowest exit width.

As an illustration of the variation in the width of a typical EDM-wire formed slot 10, the medium slot width adjacent the wire entry end 20 of the slot 10 may be 7.35 mils with a standard deviation of 0.047, the widest slot region 14 in the middle of the longitudinal extent of the slot 20 may have a width of 7.56 mils with a standard deviation of 0.067, and the narrowest slot width region 16 adjacent the exit end 18 of the slot 10 may have a width of 7.14 mils with a standard deviation of 0.066.

The slot width pattern which developed across the die face as shown in FIG. 2 was determined to be the major contributor to the bow which resulted in the extrudate being extruded through such dies. To neutralize the gradient-causing effect of the traditional slot cutting sequence, and to overcome the problem of bow, a new and novel method was devised wherein the entry point of the EDM wire was alternated on every other slot. By so alternating the slots, it made it impossible for any cumulative gradient effects to take place. Although any individual slot still displayed its typical tapered shape as shown in FIG. 1, the average width of a series of slots 10 at any point across the die became remarkably constant.

As shown in FIG. 3, a series of greatly enlarged substantially parallel alternate slots 10 are schematically shown in a fragmental piece of a die 22, such that the first slot 1 has an entrance end 20 adjacent the left side 24 of the die 22, and an exit end 18 at the right side 26 of the die. However, the next adjacent slot 2 has its entrance end 20 adjacent the right side 26 of the die 22, and its exit end 18 adjacent the left side 24 of the die. Likewise, the next adjacent slots 3 and 4 also alternate their entrance and exit ends with respect to the opposite sides of the die. The slots 10 as shown in FIG. 3 extend across the width of the die 22 from side to side and are repeated along the length of the die from near the top end 28 to near the bottom end 30. In a like manner, although not shown in FIG. 3, the slots formed along the direction of the arrow B of FIG. 2 would extend between the top end 28 and the bottom end 30 of FIG. 3 and be spaced apart along the width of the die 22 between the left side 24 and the right side 26.

Since the medium slot width 12 adjacent the wire entry end 20 and the narrow slot width region 16 adjacent the exit end 18 of the slots 10 do not point in the same direction, it is now impossible for a directional gradient to develop. Further, since the very small difference in width which does exist between any two adjacent slots is being continually alternated, it is a simple matter for these localized differences to be averaged out. Essentially, the pattern of slots as disclosed in FIG. 3 is self-compensating.

In a preferred method of EDM wire cutting a die as shown in FIG. 3, the alternate cutting sequence is accomplished by cutting every other slot across the die from end to end, and then rotating the die 180° and repeating the sequence to finish slotting the die along the desired axis, such as the A axis. Thus, after rotating the die 180° the remaining slots are formed adjacent and substantially parallel between those slots which were formed prior to rotating the die 180°. In the case of a die for forming cellular substrates, it is then necessary to rotate the die 90° so as to form a plurality of slots along the B axis. Here again, the sequence utilized alternates the point of entry of the EDM wire on every other slot by again cutting every other slot, and then rotating the die 180° and repeating the sequence to finish the slitting along that axis in a parallel but opposite direction so that the slots formed after rotating 180° are formed between those slots which were formed prior to rotating 180°. This technique results in a pattern that is self-compensating across the die and virtually eliminates the problem of bow when extruding an extrudate through the die.

Although the preferred embodiment of the invention includes the cutting of every other slot along one axis and then rotating the die 180° and repeating the sequence to finish the slotting along such axis and then rotating the die 90° and repeating the sequence, if desired, the slots along one axis could be randomly formed, such as all the even or odd numbered slots, and then the die rotated 180° to randomly form the remaining slots between those that were formed prior to rotating the die 180°. The order of forming the slots is not as important as the specific orientation of the adjacent slots wherein the inlet end of one slot is adjacent to the exit end of the next adjacent slot. It is this resulting pattern which in effect cancels out the detrimental effect of the tapered slots.

As a specific example, a die blank of stainless steel material having a width of 8" along the A axis and a length end to end of 6¾" along the B axis was slotted with a brass EDM wire having a diameter of 6 mils. Of the 8"× 6¾" die blank, a useable die face of approximately 4"×approximately 7¾" was slotted along both the A and B axes. 76 slots were formed along the A axis and 145 slots were formed along the B axis. The slot width was 7.2 mils with a standard deviation of 0.0000968". This minute deviation illustrates the degree of accuracy which has been achieved with the disclosed process. Deionized water was used as the dielectric to produce a slot depth of 0.150". Initially, 38 of the total of 76 slots to be formed along the A axis were formed in every other slot position, and the die blank was then rotated 180° and the remaining 38 slots were then formed along the A axis between those slots initially formed before rotating the die 180°. Then the die was rotated 90° and approximately ½ of the 145 slots were formed along the B axis in alternate slot positions, the die was then rotated 180° and the remainder of the 145 slots were then formed adjacent and between those slots formed prior to rotating the die 180°.

Although I have disclosed the now preferred embodiments of the invention, it will be apparent to those skilled in the art that various changes and modifications may be made thereto without departing from the spirit and scope thereof as defined in the appended claims.

I claim:

1. A method of forming slots in a workpiece utilizing a wire cutting electrical discharge machining process which comprises:

providing a workpiece having a surface for forming slots therein;

cutting by wire electrical discharge machining a plurality of spaced-apart slots along one direction across at least a portion of said surface of said workpiece;

rotating said workpiece 180 degrees;

then cutting by wire electrical discharge machining a plurality of slots across at least a portion of said surface along a direction parallel to said one direction; and, cutting said slots formed after rotating said workpiece 180 degrees, in spaced-apart portions of the workpiece between the slots cut prior to rotating said workpiece.

2. A method for forming slots in a workpiece as defined in claim 1 including the steps of cutting said spaced-apart slots by entering the electrical machining wire on one side of said workpiece, and cutting said plurality of parallel direction slots by entering the electrical machining wire on an opposite side of said workpiece.

3. A method of forming slots in a workpiece as defined in claim 2 wherein each spaced-apart slot is adjacent at least one of said parallel direction slots in such orientation that an entrance end of one slot is adjacent an exit end of an adjacent slot.

4. A method of forming slots in a workpiece as defined in claim 1 wherein each of said plurality of spaced-apart slots is adjacent at least one of said plurality of parallel direction slots.

5. A method of forming slots in a workpiece as defined in claim 1 including the steps of cutting said spaced-apart slots so as to form every other desired slot row, and after rotating said workpiece 180 degrees, cutting said parallel direction slots so as to form every other slot row between said spaced-apart slot rows.

6. A method of forming slots in a workpiece as defined in claim 1 including the step of alternating the point of entry of the electrical discharge machining wire between opposite sides of said surface with respect to adjacent slots.

7. A method of forming slots in a workpiece as defined in claim 1 including the steps of:

rotating said workpiece 90 degrees;

cutting by wire electrical discharge machining a plurality of spaced-apart slots along a second direction across at least a portion of said surface;

rotating said workpiece 180 degrees;

then cutting by wire electrical discharge machining a plurality of slots across at least a portion of said surface along a direction parallel to said second direction; and, cutting said second parallel direction slots between said spaced-apart slots formed along said second direction.

8. A method of cutting slots in a workpiece by a wire cutting electrical discharge machining process in such a manner to overcome deleterious effects of slot taper intrinsically formed by such process which comprises:

providing a workpiece with a surface to be slotted, said surface having at least one pair of opposite sides;

wire electrical discharge cutting a plurality of rows of slots across a portion of said surface; and, sequencing the wire electrical discharge cutting of said slots such that a wire entry point of each slot alternates between adjacent rows of slots.

9. A method of cutting slots in a workpiece as defined in claim 8 including the step of wire cutting said workpiece by entering the wire on one side of said workpiece in one slot row, and entering the wire on the opposite side of said workpiece in the next adjacent slot row.

10. A method of cutting slots in a workpiece as defined in claim 8 including the steps of sequencing the wire cutting of the slots by cutting every other desired slot row, rotating the workpiece 180°, and repeating the cutting sequence between those rows cut prior to rotating the workpiece 180°.

11. A method of cutting slots in a workpiece as defined in claim 8 including the step of sequencing the cutting of the slot rows such that adjacent rows are cut along the same axis, but in opposite directions.

12. A method of cutting slots in a workpiece as defined in claim 8 including the steps of rotating said workpiece 90° and sequencing wire electrical discharge cutting of additional slots, across a portion of the rows of slots formed prior to rotating said workpiece 90°, such that the wire entry point alternates between adjacent rows of said additional slots.

13. A method of cutting slots in a workpiece as defined in claim 12 including the steps of cutting all of said slots prior to rotating said workpiece 90° along one axis, but with adjacent rows cut in opposite directions, and cutting all of said additional slots along another axis but with adjacent rows thereof cut in opposite directions.

14. A method of forming discharge slots in an extrusion die for extruding honeycomb structures with virtually no deleterious bow effects, which comprises:

providing a die blank having a surface to be provided with discharge slots;

wire electrical discharge machining a first plurality of slots across a portion of said surface; and, alternating the point of entry of the electrical discharge machining wire forming each adjacent slot from one side of said surface to an opposite side.

15. A method of forming discharge slots in an extrusion die as defined in claim 14 including the steps of wire electrical discharge cutting every other desired slot along one axis, rotating said die blank 180°, and wire electrical discharge cutting every other slot between those slots formed prior to rotating said die blank.

16. A method of forming discharge slots in an extrusion die as defined in claim 15 wherein said slots formed after rotating said die blank 180° are formed along the same axis as those slots formed prior to said rotation, but in an opposite direction.

17. A method of forming discharge slots in an extrusion die as defined in claim 14 including the steps of:

determining the number of slots desired along one axis;

wire electrical discharge cutting half of the desired slots along said one axis in one of odd or even numbered slot locations;

rotating said die blank 180°; and, completing the electrical discharge cutting of the desired number of slots in the other of said odd or even numbered slot locations.

18. A method of forming discharge slots in an extrusion die as defined in claim 14 including the steps of:

rotating said die blank 90°;

wire electrical discharge machining a second plurality of slots across a portion of said surface 90° to said first plurality of slots; and, alternating the point of entry of the electrical discharge machining wire forming each adjacent slot of said second plurality of slots, from one edge of said surface to an opposite edge thereof.

19. A method of forming discharge slots in an extrusion die as defined in claim 14 including the step of wire electrical discharge cutting said first plurality of slots across a portion of said surface such that a wire entrance end of one slot is adjacent a wire exit end of an adjacent slot.

20. A method of forming discharge slots in an extrusion die as defined in claim 14 including the steps of:

alternating the point of entry of the electrical discharge machining wire by first forming a plurality of spaced-apart slots along one axis;

rotating said die blank 180°; and, then forming a second plurality of slots between said first plurality of slots along said one axis, but in an opposite direction.

21. A die for extruding cellular material comprising:

a die body having a discharge face;

a plurality of rows of slots formed in said discharge face;

alternate rows of said plurality of slots having a given slot width adjacent one side of said discharge face; and, slot rows between said alternate rows having a narrower slot width than said given slot width adjacent said one side of said discharge face.

22. A die as defined in claim 21 wherein said alternate slot rows have a slot width adjacent a side opposite said one side of said discharge face which is narrower than said given slot width.

23. A die as defined in claim 21 wherein adjacent slot rows have alternate given slot widths and narrower slot widths adjacent said one side of said discharge face and also adjacent a side opposite said one side.

\* \* \* \* \*